(12) United States Patent
Kurenuma et al.

(10) Patent No.: US 7,350,404 B2
(45) Date of Patent: Apr. 1, 2008

(54) SCANNING TYPE PROBE MICROSCOPE AND PROBE MOVING CONTROL METHOD THEREFOR

(75) Inventors: Tooru Kurenuma, Tsuchiura (JP); Hiroaki Yanagimoto, Tsuchiura (JP); Hiroshi Kuroda, Tsuchiura (JP); Yasushi Minomoto, Tsuchiura (JP); Shigeru Miwa, Tsuchiura (JP); Ken Murayama, Tsuchiura (JP); Yukio Kenbou, Tsuchiura (JP); Yuuichi Kunitomo, Tsuchiura (JP); Takenori Hiroki, Tsuchiura (JP); Yoshiyuki Nagano, Tsuchiura (JP); Takafumi Morimoto, Tsuchiura (JP)

(73) Assignee: Hitachi Kenki Fine Tech Co., Ltd., Tokyo (JP)

( * ) Notice: Subject to any disclaimer, the term of this patent is extended or adjusted under 35 U.S.C. 154(b) by 38 days.

(21) Appl. No.: 10/569,373

(22) PCT Filed: Aug. 27, 2004

(86) PCT No.: PCT/JP2004/012341

§ 371 (c)(1),
(2), (4) Date: Feb. 24, 2006

(87) PCT Pub. No.: WO2005/022124

PCT Pub. Date: Mar. 10, 2005

(65) Prior Publication Data

US 2006/0284083 A1 Dec. 21, 2006

(30) Foreign Application Priority Data

Aug. 27, 2003 (JP) ............................. 2003-302991

(51) Int. Cl.
*G21K 7/00* (2006.01)
*G01B 5/18* (2006.01)

(52) U.S. Cl. .................. 73/105; 73/104; 250/306; 250/307; 250/442.11; 29/429

(58) Field of Classification Search ................ 250/105; 73/105
See application file for complete search history.

(56) References Cited

U.S. PATENT DOCUMENTS 5,041,783 A * 8/1991 Ohta et al. .................. 324/754

(Continued)

FOREIGN PATENT DOCUMENTS

JP 6-082248 3/1994

(Continued)

*Primary Examiner*—Robert Kim
*Assistant Examiner*—Bernard Souw
(74) *Attorney, Agent, or Firm*—Mattingly, Stanger, Malur & Brundidge, PC (57) ABSTRACT

The probe tip movement control method of the scanning probe microscope is used for a scanning probe microscope provided with a cantilever 21 having a probe tip 20 facing a sample 12. The atomic force occurring between the probe tip and sample is measured when the probe tip scans the surface of the sample. X-, Y-, and Z-fine movement mechanisms 23, 29, and 30 are used to relatively change the positions of the probe tip and sample. It is possible to maintain a high measurement accuracy and enable scan movement of a probe tip on a sample surface by simple control when measuring a part having a gradient in measurement of an uneven shape on a sample surface.

4 Claims, 7 Drawing Sheets

U.S. PATENT DOCUMENTS

| | | | | |
|---|---|---|---|---|
| 5,092,163 | A * | 3/1992 | Young | 73/105 |
| 5,508,517 | A * | 4/1996 | Onuki et al. | 250/306 |
| 5,753,911 | A * | 5/1998 | Yasuda et al. | 250/306 |
| 5,773,824 | A * | 6/1998 | Flecha et al. | 250/306 |
| 6,167,753 | B1 * | 1/2001 | Chen et al. | 73/105 |
| 6,881,954 | B1 * | 4/2005 | Morimoto et al. | 250/306 |
| 2005/0012936 | A1 * | 1/2005 | Murayama et al. | 356/601 |
| 2006/0113472 | A1 * | 6/2006 | Shigeno et al. | 250/310 |
| 2006/0284083 | A1 * | 12/2006 | Kurenuma et al. | 250/309 |
| 2006/0284084 | A1 * | 12/2006 | Morimoto et al. | 250/309 |

FOREIGN PATENT DOCUMENTS

| | | |
|---|---|---|
| JP | 6-194154 | 7/1994 |
| JP | 6-201374 | 7/1994 |
| JP | 9-134552 | 5/1997 |
| JP | 11-174066 | 7/1999 |

* cited by examiner

SCANNING TYPE PROBE MICROSCOPE AND PROBE MOVING CONTROL METHOD THEREFOR

TECHNICAL FIELD

The present invention relates to a scanning probe microscope and a probe tip movement control method for the same, more particularly relates to a scanning probe microscope suitable for measurement of uneven shapes on a sample surface and a probe tip movement control method for the same.

BACKGROUND ART

A scanning probe microscope is known as a measurement apparatus enabling observation of fine objects of the atomic order or size. In recent years, scanning probe microscopes have been applied to various fields such as measurement of the fine uneven shapes or inequalities on the surface of a substrate or wafer on which semiconductor devices are produced. There are various types of scanning probe microscopes depending on the detected physical quantity used for measurement. For example, there are scanning tunnel microscopes using tunnel current, atomic force microscopes using atomic force, magnetic force microscopes using magnetic force, etc. These are also expanding in ranges of application.

Among these, atomic force microscopes are sutiable for detecting fine uneven shapes of sample surfaces by a high resolution and are proving themselves in the fields of semiconductor device substrates, disks, etc. Recently, they are also being used for applications of in-line automatic inspection processes.

An atomic force microscope is basically comprised of a measurement device utilizing the principle of an atomic force microscope. Usually, it is provided with a tripod type or tube-type XYZ-fine movement mechanism formed using piezoelectric devices. At the bottom end of this XYZ-fine movement mechanism is provided a cantilever formed with a probe tip at its front end. The front end of the probe tip faces the surface of the sample. For example, an optical lever type optical detection device is provided for the cantilever. That is, a laser beam emitted from a laser light source (laser) arranged above the cantilever is reflected at the back surface of the cantilever and detected by a photodetector. If torsion or flexing occurs at the cantilever, the position of the photodetector which the laser beam strikes changes. Therefore, if displacement occurs at the probe tip and cantilever, the detection signal output from the photodetector can be used to detect the direction and amount of the displacement. The atomic force microscope usually is provided with a comparator and controller as a control system. The comparator compares a detection voltage signal output from the photodetector and a reference voltage and outputs a difference signal. The controller generates a control signal so that this difference signal becomes 0 and gives this control signal to a Z-fine movement mechanism in an XYZ-fine movement mechanism. In this way, a feedback servo control system is formed for holding the distance between the sample and probe tip constant. The mechanism can be used to make the probe tip scan the sample surface while following along its fine uneven and measure their shapes.

An atomic force microscope had as its central challenge the measurement of surface roughness of the "nm (nanometer)" size or less utilizing its high resolution at the time it was invented. However, at the present time, when its use has grown to in-line inspection in the semiconductor production process etc., measurement of extremely steep uneven shapes has become necessary. Further, automatic measurement of 90 degree vertical side parts, side walls, etc. at uneven shapes of the sample surface, which had been considered impossible in-line applications, is being sought.

As prior art for measuring such uneven surfaces, there is the surface profile inspection system disclosed in Japanese Patent Publication (A) No. 6-82248 (Japanese Patent No. 2501282). In this surface profile inspection system, the front end of a cantilever of the atomic force microscope is given dither motion by different frequencies in a direction substantially parallel to the axial direction of the front end (vertical axis) and a direction substantially perpendicular to the axial direction of the front end. By observing the movement of the front end at this time, it is possible to measure the distance between the sample surface and front end and the local gradient of the sample surface. The path of the scan movement of the front end is controlled by measuring local gradients as they are encountered. Further, the measured values are used to determine new scan positions and new feedback adjustment directions.

According to the above conventional system, it is necessary to give the dither motion to the part of the front end of the atomic force microscope, so the precision of estimation of the gradient at the point where edges, angles, etc. of the sample surface rapidly change in gradient drops and the reliability with respect to the measurement accuracy as a whole falls as a result. Further, since the front end is made to move along the sample surface based on the data of the gradient, precision of feed control also becomes necessary for all of the three-dimensional directions and control of movement of the front end becomes complicated.

[Patent Document 1] Japanese Patent Publication (A) No. 6-82248 (Japanese Patent No. 2501282)

DISCLOSURE OF THE INVENTION

Problem to be Solved by the Invention

The subject of the present invention is to measure a part having a local gradient at an uneven shape of a sample surface without a drop in the accuracy during measurement of a sample surface by an atomic force microscope etc. and enable control of movement of the probe tip at the sample surface by a simple method.

An object of the present invention, in view of the subject, is to provide a scanning probe microscope maintaining a high measurement accuracy and enabling scan movement of a probe tip on a sample surface by simple control when measuring a part having a gradient in measurement of an uneven shape on a sample surface and a probe tip movement control method of the same.

Means for Solving the Problem

The scanning probe microscope according to the present invention and the probe tip movement control method for the same are configured as follows for achieving the above object.

The probe tip movement control method of the scanning probe microscope according to the present invention is a method for a microscope provided with a probe tip part (probe tip, cantilever, etc.) having a probe tip facing a sample, a measurement part (optical lever type optical detection device, feedback system, XYZ-fine movement mechanism, data processing or other control device, etc.) for measuring a physical quantity (atomic force etc.) occurring between the probe tip and sample when the probe tip scans the surface of the sample, and a movement mechanism (X-, Y-, and Z-fine movement mechanisms) relatively changing the positions of the probe tip and sample and having at least two degrees of freedom, the measurement part maintaining the physical quantity constant while the movement mechanism makes the probe tip scan the surface of the sample so as to measure the surface of the sample, characterized by changing an approach direction of the probe tip when a movement direction making the probe tip approach the sample surface and a reaction force direction when the probe tip contacts the sample surface differ by at set value or more.

In the probe tip movement control method, when the probe tip is moved relatively in position with respect to the sample surface by the X-, Y-, and Z-fine movement mechanisms, the reception of a reaction force of a set value or more due to a part having a gradient resulting from an uneven shape on the sample surface during an usual probe tip approach operation for approach to the sample surface is detected, the probe tip is retracted, and the approach direction of the probe tip to the sample surface is changed so as to enable accurate measurement of the part having a gradient of the sample surface.

In the above probe tip movement control method in a scanning probe microscope, preferably the method selects as the approach direction after the change an axis close to a reaction force direction at the time when the probe tip contacts the surface of the sample among the two or more degrees of freedom of the movement mechanism changing the relative distance between the probe tip and the sample. Due to this configuration, since the reaction force direction is set as the approach direction, it becomes possible to make the probe tip approach the sample surface by a direction substantially perpendicular to the part having a gradient.

In the above probe tip movement control method in a scanning probe microscope, preferably, when a need arises for changing the approach direction, the method retracts the probe tip using the approach direction changed at that time and again approaches the surface of the sample by the approach direction. Due to this configuration, it becomes possible to easily determine the approach direction, therefore it becomes possible to make the probe tip move to approach, retract from, and scan a sample surface having a gradient by simple control.

Further, the scanning probe microscope according to the present invention is provided with a probe tip part having a probe tip facing a sample and a measurement part for measuring a physical quantity occurring between the probe tip and the sample when the probe tip scans the surface of the sample, the measurement part maintaining the physical quantity constant while the movement mechanism makes the probe tip scan the surface of the sample so as to measure the surface of the sample, wherein provision is made of a control means for changing an approach direction of the probe tip when a movement direction making the probe tip approach the sample surface and a reaction force direction when the probe tip contacts the sample surface differ by at set value or more.

EFFECTS OF THE INVENTION

According to the above present invention, it is possible to suppress the force acting on the probe tip in relation to the sample surface to a set constant value by control of movement of the probe tip at the sample surface by a scanning probe microscope, so it is possible to improve the accuracy of measurement of an uneven shape on the sample surface. Further, since the force acting on the probe tip can be kept constant, the accuracy of estimation of the position of the front end of the probe tip is improved and thereby the accuracy of measurement of the shape of the sample can be raised. It is possible to lower the frequency by which force acts on the probe tip from an unforeseen direction due to a projection on the sample surface when the sample surface is scanned by the probe tip, so the probe tip can be extended in lifetime and the running costs of the scanning probe microscope can be reduced.

BEST MODE FOR WORKING THE INVENTION

Below, preferred embodiments of the present invention will be explained with reference to the drawings.

The overall configuration of a scanning probe microscope (SPM) will be explained with reference to FIG. 1. This scanning probe microscope envisions as a typical example an atomic force microscope (AFM).

The bottom part of the scanning probe microscope is provided with a sample stage 11. The sample stage 11 carries a sample 12 on it. The sample stage 11 is a mechanism for changing the position of the sample 12 by a three-dimensional coordinate system 13 comprised of a perpendicular X-axis, Y-axis, and Z-axis. The sample stage 11 is comprised of an XY-stage 14, Z-stage 15, and sample holder 16. The sample stage 11 is usually comprised of a rough movement mechanism causing displacement (change of position) at the sample side. The sample stage 11 has a sample holder 16 on the top surface of which a relatively large area, sheet shaped sample 12 is placed and held. The sample 12, for example, is a substrate or wafer on the surface of which an integrated circuit pattern of a semiconductor device is fabricated. The sample 12 is fixed on the sample holder 16. The sample holder 16 is provided with a sample-fixing chuck mechanism.

Figure 2:
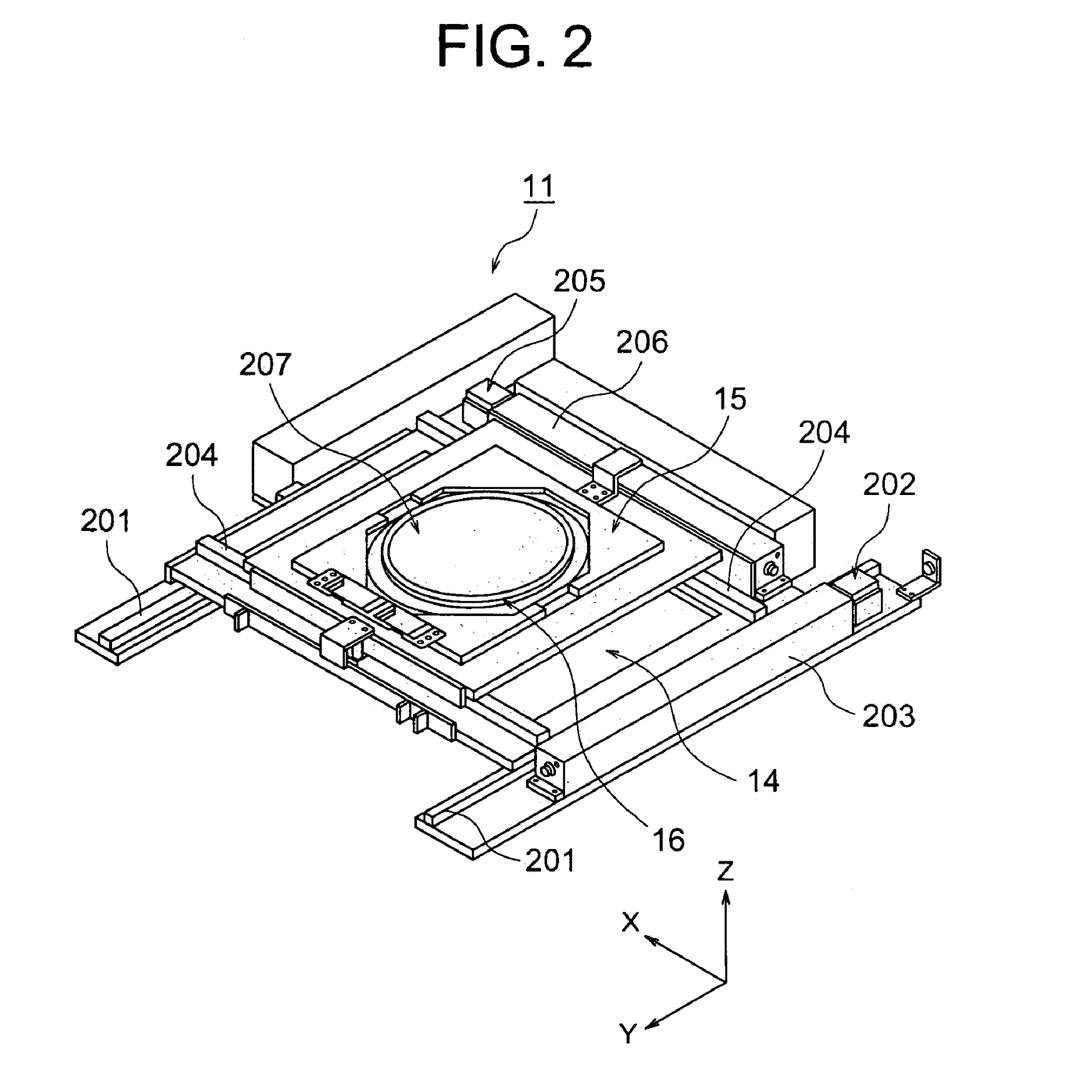
FIG. 2 A perspective view of the specific structure of a sample stage.

A specific example of the configuration of the sample stage 11 will be explained with reference to FIG. 2. In FIG. 2, 14 indicates an XY-stage, while 15 indicates a Z-stage. The XY-stage 14 is a mechanism for moving a sample on a horizontal plane (XY-plane), while the Z-stage 15 is a mechanism for moving a sample 12 in the vertical direction. The Z-stage 15 is, for example, placed on and attached to the XY-stage 14.

The XY-stage 14 is comprised of a Y-axis mechanism comprised of two parallel Y-axis rails 201 arranged in the Y-axis direction, a Y-axis motor 202, and a Y-axis drive force transmission mechanism 203 and an X-axis mechanism comprised of two parallel X-axis rails 204 arranged in the X-axis direction, an X-axis motor 205, and an X-axis drive force transmission mechanism 206. Due to the XY-stage 14, the Z-stage 15 is able to be freely moved in the X-axis direction or Y-axis direction. Further, the Z-stage 15 is provided with a drive mechanism for raising and lowering the sample holder 16 in the Z-axis direction. In FIG. 2, the drive mechanism is hidden and is therefore not shown. The sample holder 16 is provided with a chuck mechanism 207 for fixing the sample 12. For the chuck mechanism 207, usually a mechanical type or a mechanism utilizing the action of suction, electrostatics, etc. is utilized.

Figure 1:
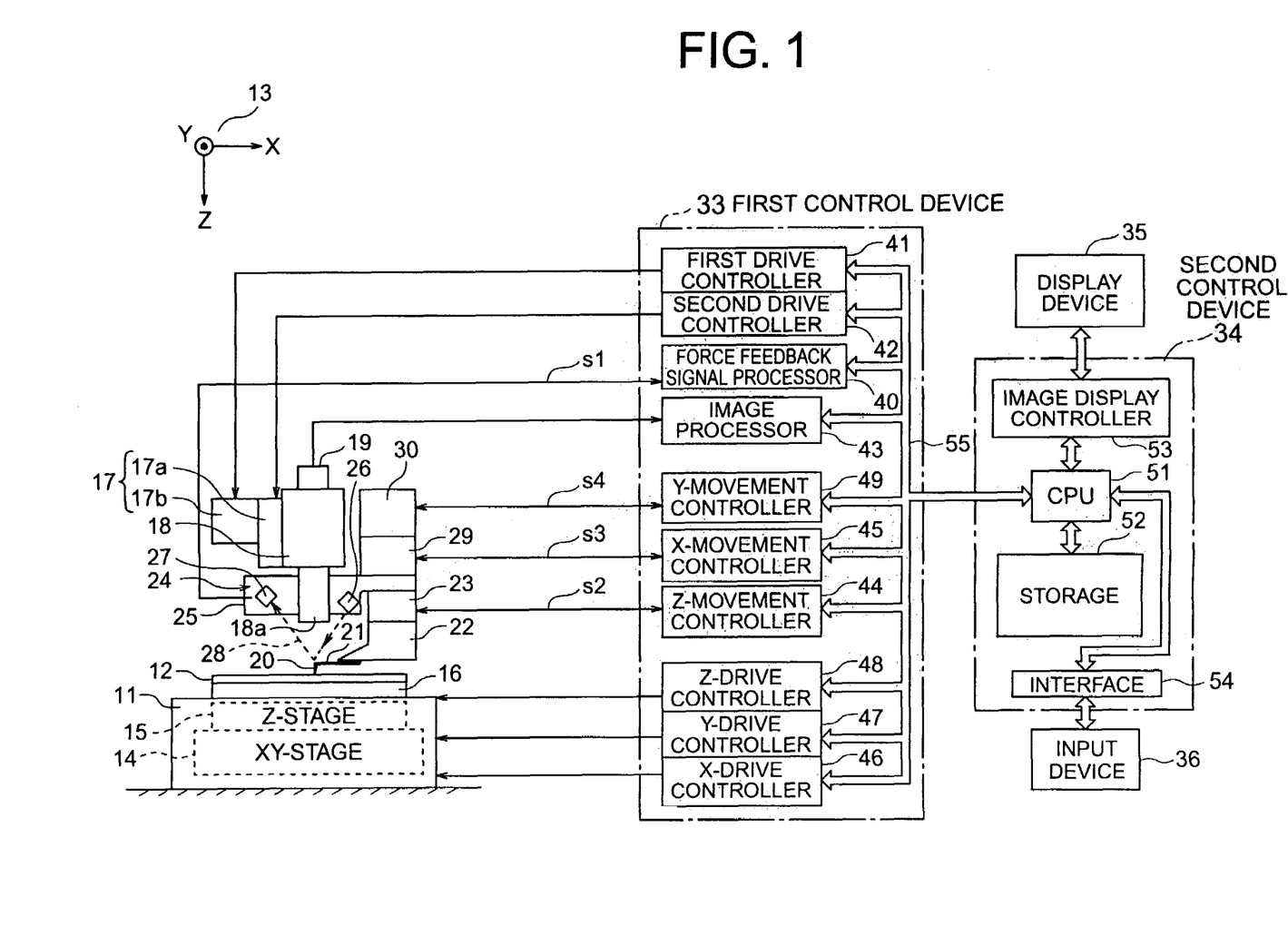
FIG. 1 View of configuration showing the overall configuration of an example of a scanning probe microscope according to the present invention as constituted by an atomic force microscope system.

In FIG. 1, at a position above the sample 12, an optical microscope 18 provided with a drive mechanism 17 is arranged. The optical microscope 18 is supported by the drive mechanism 17. The drive mechanism 17 is comprised of a focus use Z-direction movement mechanism 17a for moving the optical microscope 18 in the Z-axis direction and an XY-direction movement mechanism 17b for moving it in the X- and Y-axis directions. Due to the way they are attached, the Z-direction movement mechanism 17a moves the optical microscope 18 in the Z-axis direction, while the XY-direction movement mechanism 17b moves the unit of the optical microscope 18 and the Z-direction movement mechanism 17a in the X- and Y-axis directions. The XY-direction movement mechanism 17b is fixed to a frame member, but in FIG. 1, illustration of the frame member is omitted. The optical microscope 18 is arranged so that its object lens 18a faces downward and is arranged at a position approaching the surface of the sample 12 from directly above it. The optical microscope 18 is provided at its top end with a TV camera (imaging device) 19. The TV camera 19 captures an image of a specific area of the sample surface covered by the object lens 18a and outputs the image data.

Above the sample 12, a cantilever 21 provided with a probe tip 20 at its front end is arranged in a close state. The cantilever 21 is fixed to a mount 22. The mount 22, for example, is provided with an air suction part (not shown). This air suction part is connected to an air suction device (not shown). The cantilever 21 is affixed and mounted so that this large area base is held by suction on the suction part of the mount 22.

The mount 22 is attached to a Z-fine movement mechanism 23 causing fine movement in the Z-direction. Further, the Z-fine movement mechanism 23 is attached to the bottom surface of a cantilever displacement detector 24.

The cantilever displacement detector 24 is comprised of a laser light source 26 and a photodetector 27 attached to a support frame 25 in a predetermined relationship. The cantilever displacement detector 24 and the cantilever 21 are held in a constant positional relationship, whereby the laser light 28 emitted from the laser light source 26 is reflected at the back surface of the cantilever 21 and strikes the photodetector 27. This cantilever displacement detector is comprised of an optical lever type optical detection device. This optical lever type optical detection device can detect the displacement due to any flexing, torsion, or other deformation occurring at the cantilever 121.

The cantilever displacement detector 24 is attached to the part of an XY-fine movement mechanism. The XY-fine movement mechanism is comprised by an X-fine movement mechanism 29 and a Y-fine movement mechanism 30. The XY-fine movement mechanism allows the cantilever 21 and probe tip 20 etc. to move by fine distances in the X- and Y-axis directions. At this time, the cantilever displacement detector 24 is moved simultaneously, so the cantilever 21 and the cantilever displacement detector 24 are unchanged in optical positional relation by the displacement in the Z-axis direction being cancelled out using a not shown optical mirror.

In the above, the Z-fine movement mechanism 23, X-fine movement mechanism 29, and Y-fine movement mechanism 30 are usually comprised of piezoelectric devices. The Z-fine movement mechanism 23, X-fine movement mechanism 29, and Y-fine movement mechanism 30 make the probe tip 20 move by fine distances (for example several angstroms to several 10 μm) in the X-axis direction, Y-axis direction, and Z-axis direction.

Figure 3:
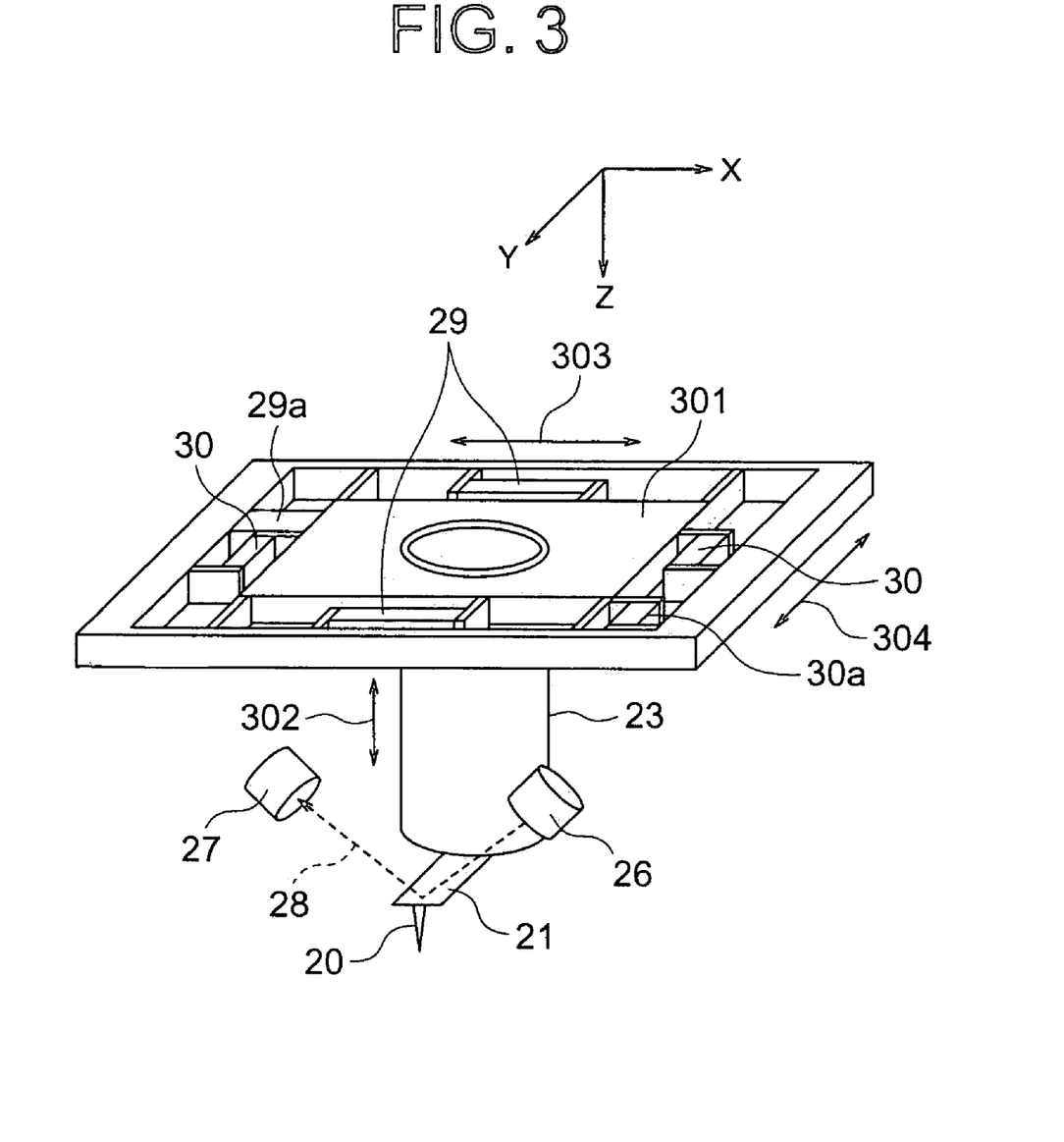
FIG. 3 A perspective view of the specific structure of a fine movement mechanism part for moving a probe tip.

FIG. 3 shows a specific example of a fine movement mechanism comprised of a Z-fine movement mechanism 23, an X-fine movement mechanism 29, and a Y-fine movement mechanism 30. The Z-fine movement mechanism 23 is formed by a cylindrically shaped piezoelectric device which is fixed at its base to a support plate 301. A the bottom end of the Z-fine movement mechanism 23, a cantilever 21 having a probe tip 20 is attached. The Z-fine movement mechanism 23 causes displacement in the Z-axis direction as shown by the arrows 302. This displacement is for example about 5 μm. The support plate 301 displaces in the X-axis direction (arrows 303) by rod shaped piezoelectric devices arranged at the two sides constituting the X-fine movement mechanism 29. Note that the X-fine movement mechanism 29 is provided with an X-axis displacement meter 29a. The X-axis displacement meter 29a is used to measure the amount of displacement caused by the X-fine movement mechanism 29 and generate an X-feedback signal (s3). Further, the support plate 301 displaces in the Y-axis direction (arrows 304) by rod-shaped piezoelectric devices arranged at its two ends constituting the Y-fine movement mechanism 30. Further, the Y-fine movement mechanism 30 is provided with a Y-axis displacement meter 30a. The Y-axis displacement meter 30a measures the amount of displacement occurring at the Y-fine movement mechanism 30 and generates an Y-feedback signal (s4). The amounts of displacement in the X-axis direction and Y-axis direction are for example 10 μm.

The above XY-fine movement mechanism is attached to the above-mentioned not shown frame member to which the unit of the optical microscope 18 is attached.

Due to the mounting relationship, the field of observation of the optical microscope 18 includes a specific area of the surface of the sample 12 and the front end (back surface) of the cantilever 21 including the probe tip 20.

Next, the control system of the scanning probe microscope will be explained. The control system is comprised of a first control device 33 and a second control device 34. The control means for realizing in principle a measurement mechanism using an atomic force microscope (AFM) is realized by software in the first control device 33. Further, the first control device 33 is a control device for controlling the drive operations of a plurality of drive mechanisms etc. Further, the second control device 34 is a higher control device.

The control means for realizing in principle a measurement mechanism using an atomic force microscope (AFM) is comprised as follows. The force feedback signal processor 40 etc. receives as input the voltage signal (signal s1) output from the photodetector 27, compares this signal and a preset reference voltage, and outputs the difference signal. An internal difference control means generates a control signal (s2 etc.) so that the difference signal becomes 0 and gives this control signal to the Z-fine movement mechanism 23 etc. Receiving the control signal s2, the Z-fine movement mechanism 23 adjusts the cantilever 21 in height position and holds the distance between the probe tip 20 and the surface of the sample 12 at a constant distance. For example, a control loop from the photodetector 27 to the Z-fine movement mechanism 23 is a feedback servo control loop for detecting the state of deformation of the cantilever 21 by the optical lever type optical detection device when the probe tip 20 scans the sample surface and maintaining the distance between the probe tip 20 and the sample 12 to a predetermined constant distance based on the reference voltage. Due to this control loop, the probe tip 20 is kept a constant distance from the surface of the sample 12 in the Z-axis direction. When scanning the surface of the sample 12 in this state, it is possible to measure uneven shapes on the sample surface.

A general feedback servo control loop is formed using the signals of the displacement meters of the X-fine movement mechanism 29 and Y-fine movement mechanism 30 as feedback signals. In FIG. 1, the signal s3 is an X-scan signal and the X-feedback signal. Further, the signal s4 is a Y-scan signal and the Y-feedback signal.

Next, the first control device 33 is a control device for driving the different parts of the scanning probe microscope and is provided with the following functional parts.

The optical microscope 18 is changed in position by a drive mechanism 17 comprised of a focus use Z-direction movement mechanism 17a and an XY-direction movement mechanism 17b. The first control device 33 is provided with a first drive controller 41 and second drive controller 42 for controlling the operations of the Z-direction movement mechanism 17a and XY-direction movement mechanism 17b.

The images of the sample surface and cantilever 21 obtained by the optical microscope 18 are captured by the camera 19 and taken out as image data. The image data obtained by the camera 19 of the optical microscope 18 is input to the first control device 33 and processed by an internal image processor 43.

In principle, the control signal s2 for the Z-fine movement mechanism 23 obtained based on the feedback servo control loop means the height signal of the probe tip 20 in a scanning probe microscope (atomic force microscope). The height signal of the probe tip 20, that is, the control signal s2, can give information relating to the change of the height position of the probe tip 20. The control signal s2 is given from the Z-movement controller 44.

The sample surface scanning operation by the probe tip 20 on the measurement area in the surface of the sample 12 is performed by driving the X-fine movement mechanism 29 and Y-fine movement mechanism 30. The drive operation of the X-movement mechanism 29 is controlled by an X-scan controller 45 providing an X-scan signal to the X-fine movement mechanism 29 and receiving an X-feedback signal, while the drive operation of the Y-movement mechanism 30 is controlled by a Y-scan controller 49 providing a Y-scan signal to the Y-fine movement mechanism 30 and receiving a Y-feedback signal.

Further, the driving of the XY-stage 14 and Z-stage 15 of the sample stage 11 is controlled by an X-drive controller 46 outputting an X-direction drive signal, a Y-drive controller 47 outputting a Y-direction drive signal, and a Z-drive controller 48 outputting a Z-direction drive signal.

Note that the first control device 33, in accordance with need, is provided with a storage (not shown) for storing and preserving the set control data, input optical microscope image data, data on the height position of the probe tip, etc.

The second control device 34 is provided at a position above the first control device 33. The second control device 34 stores and runs a usual measurement program, sets and stores the usual measurement conditions, stores and runs an automatic measurement program, sets and stores measurement conditions, stores measurement data, processes the measurement results, displays information on the display device (monitor) 35, and performs other processing. In particular, in the case of the present invention, there is provided a program which includes a measurement process changing the direction of movement of the probe tip with respect to projections, depressions, etc. of the sample surface and other parts having a gradient so as to measure the parts in automatic measurement and which automatically changes the direction of movement (approach etc.) of the probe tip so as to measure the gradient parts. For setting the measurement conditions, it has functions for setting basic matters such as the measurement range and measurement speed and the direction of movement, setting measurement conditions and other automatic measurement conditions and postures and other conditions of automatic measurement. These conditions are stored and managed in a setting file. Further, it is configured with a communication function and can be given a function enabling communication with an external device.

Since the second control device 34 has the above-mentioned function, it is comprised of a processing unit constituted by a CPU 51 and storage 52. The storage 52 stores and preserves the program and condition data etc. Further, the second control device 34 provides an image display controller 53 and communicator etc. In addition, the second control device 34 has an input device 36 connected to it through an interface 54. The input device 36 enables the measurement program, measurement conditions, data, etc. stored in the storage 52 to be set and changed.

The CPU 51 of the second control device 34 provides higher control instructions etc. through the bus 55 to the functional parts of the first control device 33 and is provided with image data and data relating to the height position of the probe tip from the image processor 43, data processor 44, etc.

Next, the basic operation of the scanning probe microscope (atomic force microscope) will be explained.

The front end of the probe tip 20 of the cantilever 21 is made to approach a predetermined area of the surface of the semiconductor substrate or other sample 12 placed on the sample stage 11. Usually, a probe tip approach mechanism constituted by the Z-stage 15 brings the probe tip 20 close to the surface of the sample 12 and applies atomic force to make the cantilever 21 flex. The amount of flexing due to the flexing of the cantilever 21 is detected by the above-mentioned optical lever type optical detection device. In this state, the probe tip 20 is made to move over the sample surface to scan the sample surface (XY-scan). The XY-scan by the probe tip 20 of the surface of the sample 12 is performed by moving the probe tip 20 side by the X-fine movement mechanism 29 and the Y-fine movement mechanism 30 (fine movement) or by moving the sample 12 side by the XY-stage 14 (rough movement) so as to create relative movement in the XY-plane between the sample 12 and the probe tip 20.

The probe tip 20 and the related section in this side are moved by giving an X-scan signal s3 for X-fine movement to the X-fine movement mechanism 29 provided with the cantilever 21 and by giving a Y-scan signal s4 for Y-fine movement to the Y-fine movement mechanism 30. The scan signal s3 for X-fine movement is given from the X-scan controller 45 in the first control device 33, while the scan signal s4 for Y-fine movement is given from the Y-scan controller 49 in the first control device 33. On the other hand, the sample side is moved by giving drive signals from the X-drive controller 46 and Y-drive controller 47 to the XY-stage 14 of the sample stage 11.

The X-fine movement mechanism 29 and Y-fine movement mechanism 30 are comprised utilizing piezoelectric devices and enable high precision and high resolution scan movement. Further, the measurement range measured by the XY-scan by the X-fine movement mechanism 29 and Y-fine movement mechanism 30 is restricted by the strokes of the piezoelectric devices, so even at a maximum becomes a range determined by a distance of about 100 μm. According to the XY-scan by the X-fine movement mechanism 29 and Y-fine movement mechanism 30, a fine, narrow range is measured. On the other hand, the XY-stage 14 is usually comprised utilizing an electromagnetic motor as the drive part, so can be increased in stroke to several hundred mm or more. According to the XY-scanning operation by the XY-stage, a wide range is measured.

In the above way, a predetermined measurement area on the surface of the sample 12 is scanned by the probe tip 20 and the amount of flexing of the cantilever 21 (amount of deformation due to flexing etc.) is controlled to become constant based on a feedback servo control loop. The amount of flexing of the cantilever 21 is controlled so as to constantly match with a reference target amount of flexing (set by reference voltage Vref). As a result, the distance between the probe tip 20 and the surface of the sample 12 is held at a constant distance. Therefore, the probe tip 20, for example, moves along (scans) the surface of the sample 12 while following its profile. The height signal of the probe tip is obtained to enable measurement of the profile of the surface of the sample 12.

Figure 4:
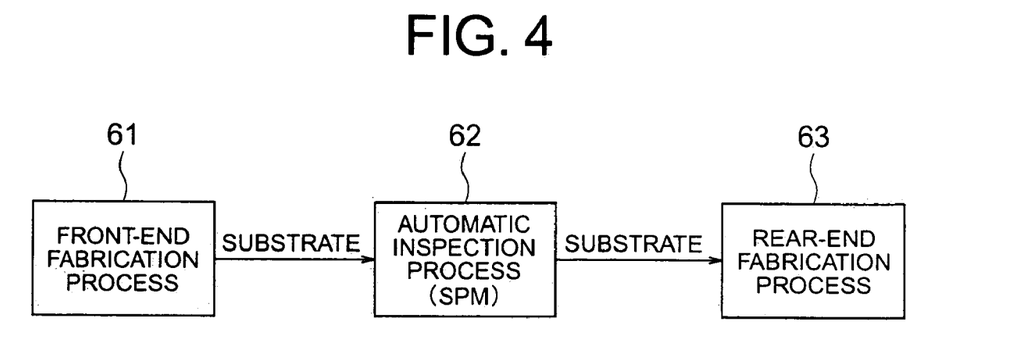
FIG. 4 A view of a semiconductor production line including an automatic inspection process including a scanning probe microscope.

In this way, the scanning probe microscope, for example, as shown in FIG. 4, is built into the middle of an in-line fabrication system for semiconductor devices (LSIs) as an automatic inspection process 62 for inspecting the substrates (or wafers). A not shown substrate transport system is used to unload a substrate (sample 12) for inspection from a front-end fabrication process 61. If placing a substrate on the substrate holder 16 of the scanning probe microscope (SPM) of the automatic inspection process 62, the profile of a predetermined area of the substrate surface is automatically measured by the scanning probe microscope, the quality of the processing in fabrication of the substrate is judged, and then the substrate is unloaded by the substrate transport system to the rear-end fabrication process 63.

Figure 5:
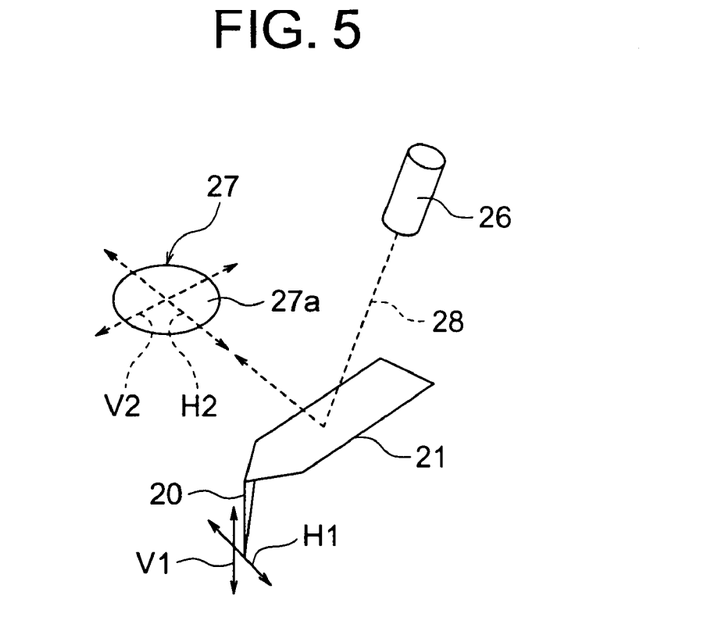
FIG. 5 A view for explaining the force applied to a cantilever and the amount of deformation occurring at the cantilever.

FIG. 5 is a perspective view as seen from above showing enlarged the part of the cantilever 21 and probe tip 20. FIG. 5 explains in detail the relationship between the deformation of the cantilever 21 and the laser light 28 at the optical lever type optical detection device. The laser light 28 emitted from a laser light source 26 is reflected at the back surface of the cantilever 21 and strikes a light receiving surface 27a of a photodetector 27. By capturing the direction of movement of the position which the laser light 28 strikes with respect to the position of a spot striking the light receiving surface 27a of the photodetector 27 in the state with no atomic force applied to the probe tip 20 provided at the front end of the cantilever 21, it is possible to accurately detect the magnitude and direction of the force acting on the probe tip 20 through deformation of the cantilever 21. As shown in FIG. 5, when for example force of the H1 direction is applied to the probe tip 20, the photodetector 27 catches this as a change in the spot position in the H2 direction. Further, when force of the V1 direction is applied to the probe tip 20, the photodetector 27 catches this as a change in the spot position in the V2 direction. Here, the force in the H1 direction is called "torsional direction force", while V1 direction force is called "flex direction force".

Note that the method for detecting the atomic force etc. applied from the sample surface to the probe tip 20 includes, in addition to the optical lever type optical detection device, utilization of optical interference or other optical principles or a strain detection element provided at the cantilever.

Figure 7:
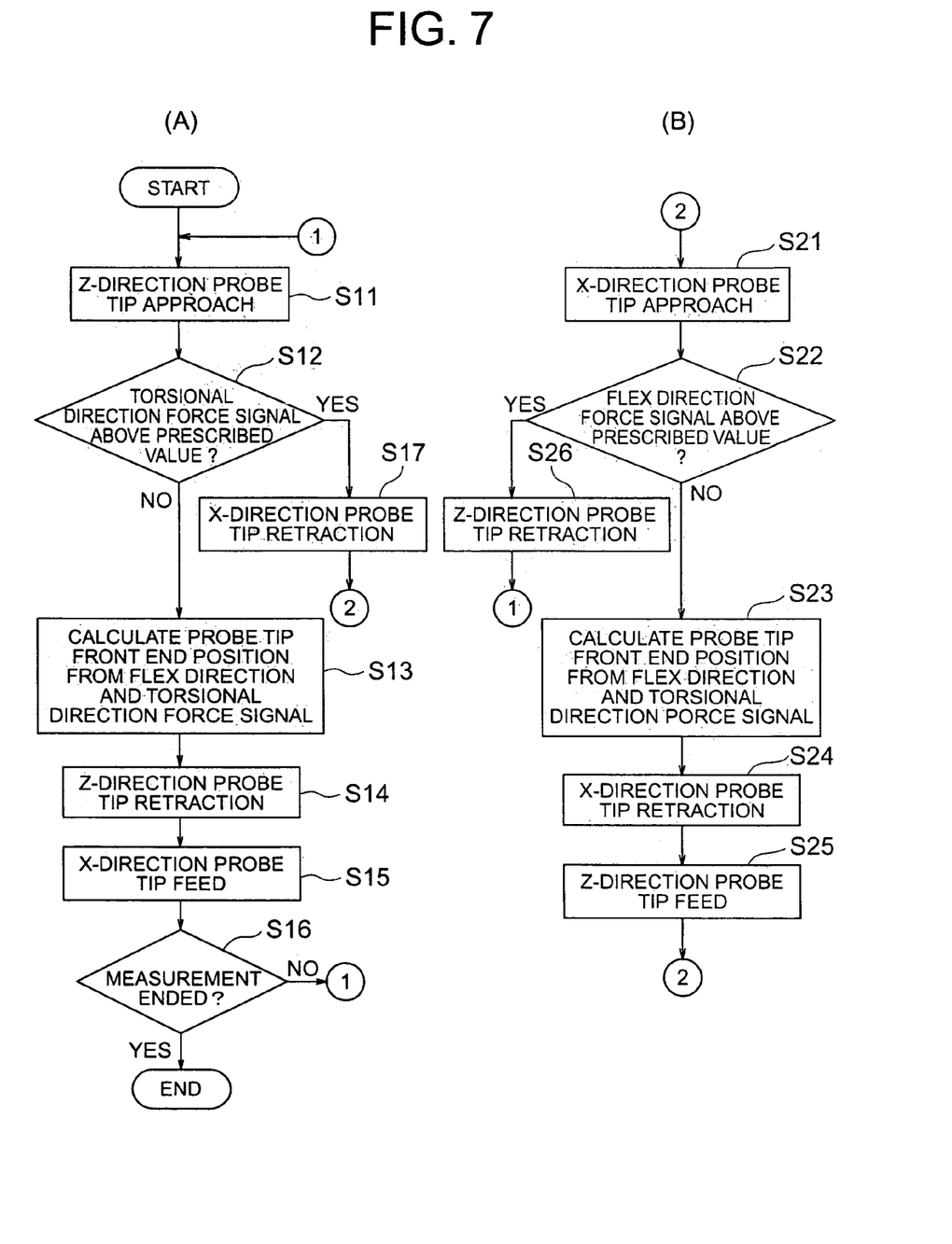
FIG. 7 A flow chart of control of movement of the probe tip.
Figure 8:
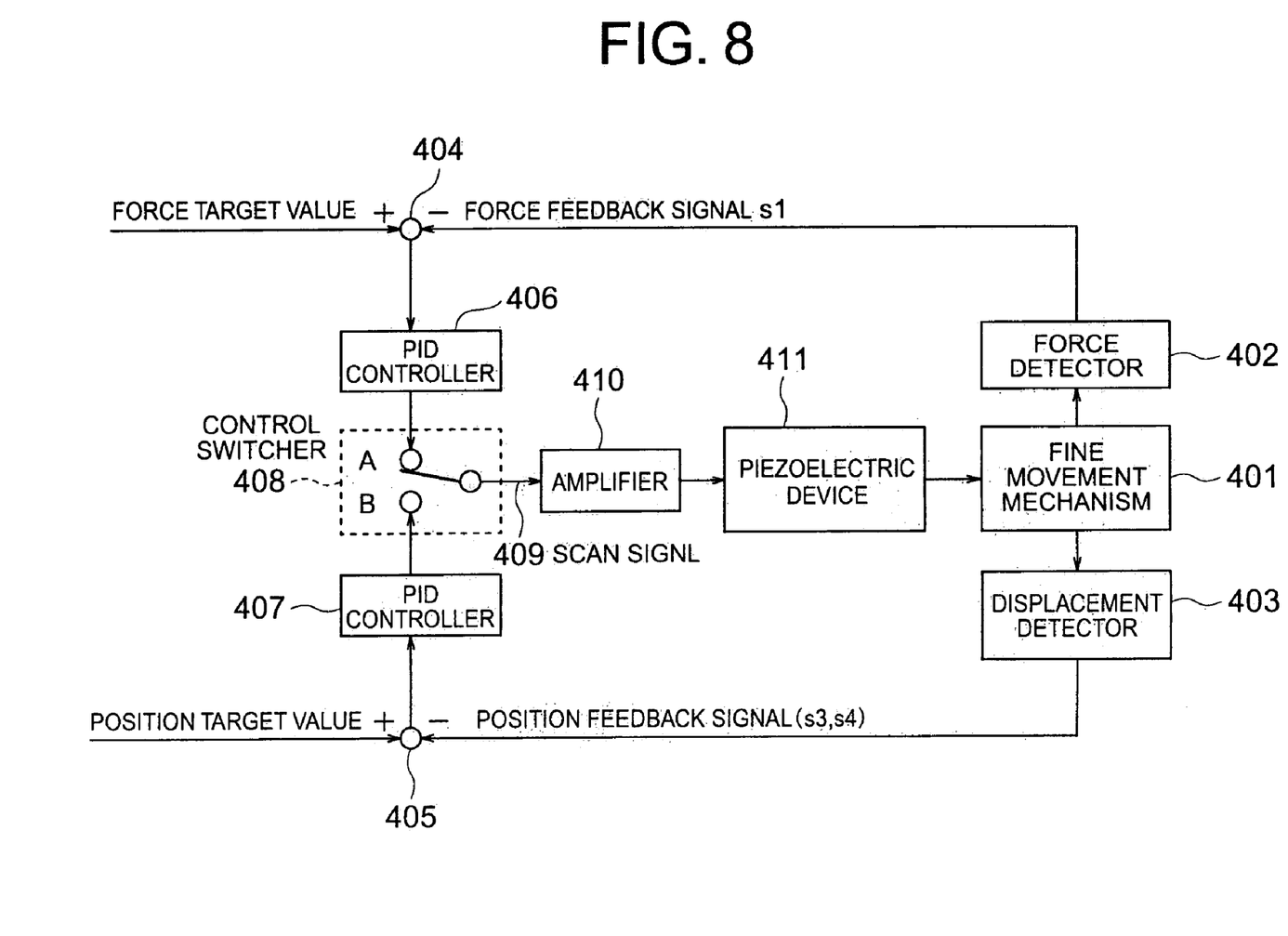
FIG. 8 A block diagram of control blocks relating to control of movement of the probe tip.

Next, the automatic measurement method characteristic of a scanning probe microscope will be explained with reference to FIG. 6 to FIG. 8. This automatic measurement method includes a measurement process measuring projections, depressions, etc. in a specific area inspected on the surface of a sample 12 while automatically changing the direction of approach of the probe tip in measurement of walls having gradients of for example about 90 degrees.

Figure 6:
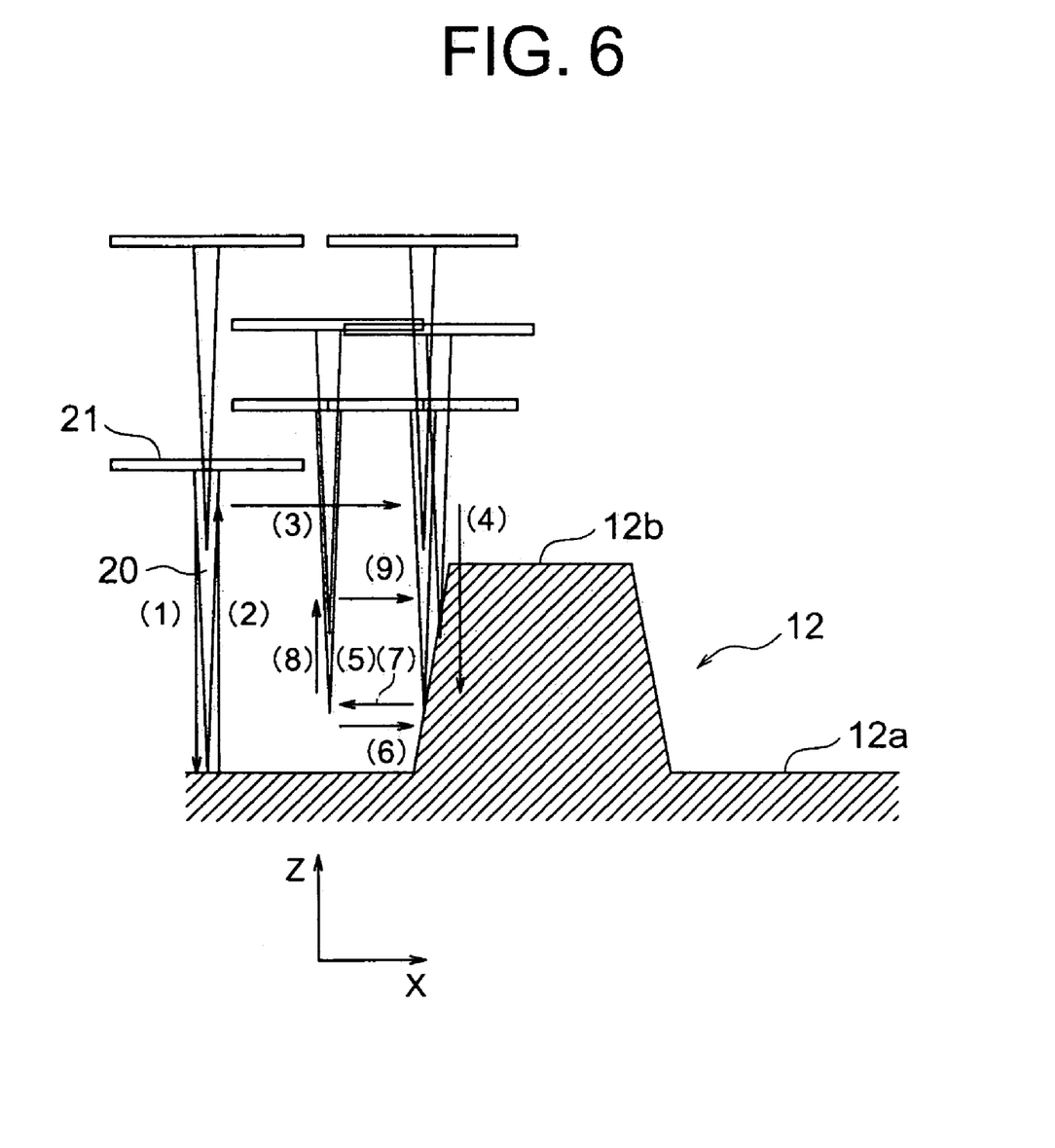
FIG. 6 A view of the characteristic state of movement of the probe tip at the sample surface.

For measurement of a location including a projection 12b on the surface 12a of a sample 12 as shown in FIG. 6, the probe tip 20 is moved to scan the sample surface 12a while being made to approach and retract from it. Steps (1) to (9) of movement of the probe tip 20 at this time shown in FIG. 6 (below, referred to as "Movement (1) to (9)") and the steps in operational control shown in FIG. 7 relating to this movement operation will be explained. The control blocks realized by the second control device 34 as hardware functions for realizing the steps of the operational control shown in FIG. 7 are shown in FIG. 8.

In the control blocks, the fine movement mechanism 401 is a mechanical part comprised of the above-mentioned Z-fine movement mechanism 23, X-fine movement mechanism 29, and Y-fine movement mechanism 30. The force detector 402 is a part comprised of the above-mentioned optical lever type optical detection device. The force feedback signal output from the force detector 402 is the signal s1. A displacement detector 403 is a part comprised of the above-mentioned X-axis displacement meter 29a and Y-axis displacement meter 30a. The position feedback signals output from the displacement detector 403 are the signals s3, s4, etc. In the control blocks, a force taret value is set for the force feedback signal. The processor 404 finds the difference. Further, a position target value is set for the position feedback signal. The processor 405 finds the difference. The signals obtained by the processors 404 and 405 pass through the PID controllers 406 and 407 are are given to the control switcher 408. The signal 409 output from the control switcher 408 is supplied as a scan signal through the amplifier 410 to the piezoelectric devices 411 of the fine movement mechanisms to operate the fine movement mechanisms 401. The control switcher 408 selects the force feedback signal or position feedback signal in control of movement of the probe tip.

Movement (1): The probe tip 20 is made to the approach the sample 12 (step S11). The movement operation for making the probe tip 20 in a state separated from the sample surface approach the surface to an extent where atomic force acts is usually performed by operation of the Z-fine movement mechanism 23. The Z-movement controller 44 of the first control device 33 generates a Z-scan signal in a sample approach direction. When the probe tip contacts the sample surface, a force in the flexing direction acts on the cantilever 21. This is controlled to a certain amount then the movement is stopped. Next, it is checked that the force in the torsional direction is not more than a prescribed value (step S12). The position of the front end of the probe tip 20 is detected using the amount of displacement (position) at this time as a Z-feedback signal (step S13) and the surface position is recorded. At this time, the amounts of deformation of the cantilever 21 and probe tip 20 may be adjusted from the forces in the flexing direction and torsional direction.

Movement (2): Next, the probe tip 20 is retracted from the sample surface 12a (step S14). The first control device 33 generates a Z-scan signal in a sample retraction direction. It confirms movement by a certain distance by the Z-feedback signal, then stops movement.

Movement (3): Next, the probe tip 20 is fed by a certain amount in the X-direction (step S15). The X-movement controller 45 of the first control device 33 generates a X-scan signal. It confirms movement by a certain distance by the X-feedback signal, then stops movement.

Movement (4): After this, whether measurement has ended or not is judged (step S16). When NO at the judgment step S16, the probe tip 20 is again made to approach the sample 12 (step S11). When YES at the judgment step S16, the measurement is ended. At step S11, the Z-fine movement mechanism 23 is operated by the first control device 33 generating a Z-scan signal in the sample approach direction.

When the probe tip 20 contacts the sample surface 12a, force in the flexing direction acts on the cantilever 21. This is controlled to a constant amount to stop the movement. In this case, the contact point becomes the inclined surface of the projection 12b of the sample 12. The direction of the reaction force acting on the probe tip 20 greatly differs from the flexing direction as compared with the approach direction. The probe tip 20 slides on the sample surface so it is difficult to accurately measure the Z-position at the X-position at the start of approach sought.

Movement (5): Therefore, when force in the torsional direction is generated in a prescribed value or more (step S12), the direction of the operating axis close to this reaction force direction is selected and retracted along (step S17). In this case, the X-direction is selected and retracted along.

Movement (6): Next, the probe tip 20 is again made to approach the surface in the X-direction (step S21). When the probe tip 20 approaches the sample surface 12a, force in the torsional direction acts on the cantilever 21. This is controlled to a constant amount to stop movement. Next, it is confirmed that the force in the flexing direction not a prescribed value or more (step S22). The amount of displacement of the position of the front end of the probe tip at this time is detected by the X-feedback signal (step S23) and the surface position is recorded. At this time, the amounts of deformation of the cantilever 21 and probe tip 20 may be adjusted from the forces in the flexing direction and torsional direction.

Movement (7): The probe tip 20 is retracted in the X-direction in a direction opposite to the approach direction (step S24).

Movement (8): The probe tip 20 is fed by a constant amount in the Z-direction (step S25). Regarding the feed direction, with respect to a position in the Z-direction measured at the Movement (1), if the position in the Z-direction measured at the Movement (6) is "+(plus)", the probe tip is fed in the +direction, while if it is "−(minus)", the probe tip is fed in the −direction.

Movement (9): The probe tip 20 is again made to approach the surface in the X-direction (step S21). When YES at the next judgment step S22, the probe tip is retracted in the Z-direction (step S26), then the routine shifts to step S11.

As exceptional processing occurring during approach, a situation where the probe tip 20 never contacts the sample surface not matter how much time elapses may be envisioned. At this time, if measuring the idling distance or time and finding the tip and surface do not contact each other for more than certain values of the same, the processing is terminated, the probe tip is fed in the approach direction to a position a certain amount of feed from the previous contact position, and the approach direction is switched for the approach.

Note that here the control blocks shown in FIG. 8 will be explained in relation to the flow chart shown in FIG. 7. The X-, Y-, and Z-axes are independently controlled. The signals of FIG. 8 are treated as three-dimensional vectors. Therefore, the control blocks shown in FIG. 8 are provided for each of the X-, Y-, and Z-axes.

Z-direction probe tip approach: A force target value Fz is set, and the control switcher 408 is set to the A side. The force detection detects a flex signal which is used as a force feedback signal. Due to this, the probe tip can be made to approach the sample and stop in the contact state.

Z-direction probe tip retraction: A position target value Pz1 for retracting the probe tip 20 is set, and the control switcher is set to the B side. The displacement of the Z-fine movement mechanism is detected and used as the Z-feedback signal. When reaching the position target value, the movement is stopped.

X-direction probe tip feed: A position target value Px2 obtained by adding the amount of feed of the probe tip 20 to the current position is set, and the control switcher 408 is set at the B side. The displacement of the x-fine movement mechanism is detected and is used as the X-feedback signal. When reaching the position target value, the movement is stopped.

X-direction probe tip retraction: A position target value Px1 for retracting the probe tip 20 is set, and the control switcher is set to the B side. The displacement of the X-fine movement mechanism is detected and used as the X-feedback signal. When reaching the position target value, the movement is stopped.

X-direction probe tip approach: A force target value Fx is set, and the control switcher 408 is set to the A side. The force detection detects a torsional signal which is used as a force feedback signal. Due to this, the probe tip can be made to approach the sample and stop in the contact state.

Z-direction probe tip feed: A position target value Pz2 obtained by adding the amount of feed of the probe tip to the current position is set, and the control switcher 408 is set at the B side. The displacement of the Z-fine movement mechanism is detected and is used as the Z-feedback signal. When reaching the position target value, the movement is stopped.

The configurations, shapes, sizes (thicknesses), and layouts explained in the above embodiments are only shown schematically to an extent enabling the present invention to be understood and worked. Further, the numerical values and compositions (materials) are only shown for illustration. Therefore, the present invention is not limited to the explained embodiments and can be changed in various ways within the scope of the technical idea shown in the claims.

INDUSTRIAL APPLICABILITY

The present invention provides an atomic force microscope or other scanning probe microscope that measures the surface shape of a silicon wafer or other sample on which a semiconductor device is fabricated. It uses force feedback control when controlling movement of the probe tip to suitably change the approach operation to the sample surface and improve the accuracy of measurement of a part having a gradient on the sample surface.

DESCRIPTION OF NOTATIONS

11 sample stage
12 sample
14 XY-stage
15 Z-stage
16 sample holder
20 probe tip
21 cantilever

The invention claimed is:

1. A probe tip movement control method in a scanning probe microscope provided with a probe tip part having a probe tip facing a sample, a measurement part for measuring a physical quantity occurring between said probe tip and said sample when said probe tip scans the surface of said sample, and a movement mechanism relatively changing the positions of said probe tip and said sample and having at least two degrees of freedom, said measurement part maintaining said physical quantity constant while said movement mechanism making said probe tip scan the surface of said sample so as to measure the surface of said sample, said probe tip movement control method comprising the step of changing an approach direction of said probe tip when a movement direction with which said probe tip approaches the sample surface and a reaction force direction when said probe tip contacts the sample surface differ by at set value or more.

2. A probe tip movement control method in a scanning probe microscope as set forth in claim 1, further comprising the step of selecting as the approach direction after said change an axis close to a reaction force direction at the time when said probe tip contacts the surface of said sample among the degrees of freedom of said movement mechanism changing the relative distance between said probe tip and said sample.

3. A probe tip movement control method in a scanning probe microscope as set forth in claim 1, further comprising the step of, when a need arises for changing the approach direction, retracting the probe tip using the approach direction changed at that time and again approaching the surface of said sample by said approach direction.

4. A scanning probe microscope provided with a probe tip part having a probe tip facing a sample, a measurement part for measuring a physical quantity occurring between said probe tip and said sample when said probe tip scans the surface of said sample, and a movement mechanism having at least two degrees of freedom that changes the relative positions of said probe tip to said sample, said measurement part maintaining said physical quantity constant while said movement mechanism making said probe tip scan the surface of said sample so as to measure the surface of said sample, said scanning probe microscope being provided with a control means for changing an approach direction of said probe tip when a movement direction with which said probe tip approaches the sample surface and a reaction force direction when said probe tip contacts the sample surface differ by at set value or more.

* * * * *